(12) United States Patent
Muramoto et al.

(10) Patent No.: US 8,098,660 B2
(45) Date of Patent: Jan. 17, 2012

(54) TRANSMITTING APPARATUS AND TRANSMITTING METHOD

(75) Inventors: Eiichi Muramoto, Kanagawa (JP);
Takahiro Yoneda, Tokyo (JP);
Kazunobu Konishi, Tokyo (JP);
Chih-chang Hsu, Tokyo (JP)

(73) Assignee: Panasonic Corporation, Osaka (JP)

( * ) Notice: Subject to any disclaimer, the term of this patent is extended or adjusted under 35 U.S.C. 154(b) by 135 days.

(21) Appl. No.: 11/997,130

(22) PCT Filed: Jul. 28, 2006

(86) PCT No.: PCT/JP2006/314979
§ 371 (c)(1),
(2), (4) Date: Oct. 15, 2009

(87) PCT Pub. No.: WO2007/015428
PCT Pub. Date: Feb. 8, 2007

(65) Prior Publication Data
US 2010/0158000 A1    Jun. 24, 2010

(30) Foreign Application Priority Data

Aug. 1, 2005  (JP) ................................. 2005-222378

(51) Int. Cl.
*H04L 12/56* (2006.01)
(52) U.S. Cl. ..................................... 370/390; 370/395.4
(58) Field of Classification Search .......................... None
See application file for complete search history.

(56) References Cited

U.S. PATENT DOCUMENTS

| 5,459,719 | A | | 10/1995 | Hayashi |
| 5,875,175 | A | * | 2/1999 | Sherer et al. .................. 370/230 |
| 5,875,176 | A | * | 2/1999 | Sherer et al. .................. 370/230 |
| 6,647,011 | B1 | * | 11/2003 | Zhou et al. ............... 370/395.41 |
| 6,862,279 | B1 | | 3/2005 | Imai |
| 2007/0002859 | A1 | * | 1/2007 | Corson et al. ................. 370/390 |

FOREIGN PATENT DOCUMENTS

| JP | 6-006350 | 1/1994 |
| JP | 6-326713 | 11/1994 |
| JP | 10-098464 | 4/1998 |
| JP | 11-225166 | 8/1999 |

(Continued)

OTHER PUBLICATIONS

Zhang, Baoxian and Mouftah, Hussein T., "Providing Multicast through Recursive Unicast", Jan. 2005, IEEE Communications Magazine, pp. 115-121.*
International Search Report dated Oct. 31, 2006.

(Continued)

*Primary Examiner* — Chirag Shah
*Assistant Examiner* — Steve Young
(74) *Attorney, Agent, or Firm* — Dickinson Wright PLLC

(57) ABSTRACT

To transmit multimedia data in such a manner that is adaptive to the transmission capability of a receiving apparatus and/or to the congestion state of a network. In a transmitting apparatus (100), a receiver capability estimating part (102) estimates, based on feedback information from a receiving apparatus (200), a useable band. A receiver classifying part (103) classifies, based on the useable band, the receiving apparatus. A receiver list rearranging part (105) rearranges, in order of transmission capability, a receiver list where classified receiving apparatuses are listed in classes. A packet generating part (106) generates a packet having the receiver list and transmits it at an appropriate transmission rate.

6 Claims, 10 Drawing Sheets

FOREIGN PATENT DOCUMENTS

| | | |
|---|---|---|
| JP | 2000-201175 | 7/2000 |
| JP | 2000-354063 | 12/2000 |
| JP | 2001-007835 | 1/2001 |
| JP | 2002-325095 | 11/2002 |
| JP | 2004-120222 | 4/2004 |
| JP | 2004-254025 | 9/2004 |

OTHER PUBLICATIONS

Notice of the Reasons for Rejection dated Jun. 8, 2010.
Y. Imai, et al., "XCAST6: eXplicit Multicast on IPv6," IEEE/IPSJ SAINT2003 Workshop 4, IPv6 and Applications, Jan. 2003, pp. 1-6.
M. Handley, et al., "TCP Friendly Rate Control (TFRC): Protocol Specification," RFC 3448, Jan. 2003, pp. 1-24.
E. Muramato, et al., "Proposal for Congestion Control Method on Sender Initiated Multicast," Internet Conference, Oct. 2003, pp. 1-6, with English translation.
L. Aguilar, "Datagram Routing For Internet Multicasting," Sigcomm 84, Mar. 1984, pp. 58-63.
S.M. Bellovin, "A Best-Case Network Performance Model," Feb. 1992, pp. 1-10.

* cited by examiner

FIG.3

| DESTINATION ADDRESS | MAXIMUM TRANSMISSION RATE |
|---|---|
| 144.10.0.1 | 256 |
| 172.20.0.8 | 1000 |
| ... | ... |
| 192.30.0.144 | 64 |

301 — DESTINATION ADDRESS
302 — MAXIMUM TRANSMISSION RATE

FIG.4

| DESTINATION ADDRESS | MAXIMUM TRANSMISSION RATE | CLASS UPDATE TIME |
|---|---|---|
| 144.10.0.1 | 256 | 04:02:05 |
| 172.20.0.8 | 1000 | 04:10:10 |
| ... | ... | ... |
| 192.30.0.144 | 64 | 04:30:03 |

301 — DESTINATION ADDRESS
302 — MAXIMUM TRANSMISSION RATE
401 — CLASS UPDATE TIME

TRANSMITTING APPARATUS AND TRANSMITTING METHOD

TECHNICAL FIELD

The present invention relates to a transmitting apparatus and transmitting method for transmitting multimedia data such as images and speech with high quality.

BACKGROUND ART

Recently, with substantial development of network systems, multimedia data is more often transmitted to a plurality of receiving apparatuses belonging to the same group in, for example, television conference or network games. In this case, multicast communication is known as a communication method for effectively transmitting the same packet to all receiving apparatuses.

A transmitting apparatus classifies receiving apparatuses to which multimedia data is delivered, into small groups of about ten people, and carries out multicast communication on a per small group basis. Multicast communication schemes include the explicit multicast scheme. These schemes refer to storing destination addresses of all receiving apparatuses belonging to a group in an option header or payload of a packet as a receiver list and explicitly specifying all receiving apparatuses to which a packet is delivered, at a transmitting apparatus. Hereinafter, what is simply referred to as a "packet" in this description refers to a packet according to the explicit multicast scheme.

There is "explicit multicast" (hereinafter "XCAST") as a typical explicit multicast scheme (see Non-Patent Document 1).

A packet distribution method according to the explicit multicast scheme will be described in detail.

When receiving a packet, a router supporting the explicit multicast scheme searches a unicast route list that the router has for all destination addresses stored in the option header or payload of the packet and check the transmission interface matching each destination address. Further, when the packet needs to be outputted to a plurality of output interfaces, the router duplicates packets equaling the number of transmission interfaces. At this time, the router deletes destination addresses other than destination addresses of receiving apparatuses included in the transmission interfaces from the option header of a packet or adds a mark showing that delivery is completed. Further, the router rewrites the destination addresses written in the IF header to the addresses of receiving apparatuses to which a packet is not yet delivered.

On the other hand, the router that does not support the explicit multicast scheme searches the unicast route list from the destination address written in the IP header without referring to the destination addresses stored in the packet. Then, similar to normal unicast communication, the router transmits the packet. That is, the router that does not support the explicit multicast scheme does not carry out multicast communication. However, when a receiving apparatus that supports the explicit multicast scheme receives this packet, the apparatus refers to the receiver list stored in the option header. Further, when the receiver list includes destination addresses to which the packet is not yet delivered, the receiving apparatus duplicates packets, rewrites the destination addresses of the IF header to destination addresses to which the packet is not yet delivered, and transmits the packet.

According to the above method, in the explicit multicast scheme, even if all routers on the route do not support the explicit multicast scheme, the packet could be delivered to all receiving apparatuses.

FIG. 9(a) illustrates this operation.

In FIG. 9(a), when transmitting a packet to receiving apparatuses 902 to 904, transmitting apparatus 901 writes the delivery order from receiving apparatuses 902 to 904 as is in the receiver list and stores this the option header.

Here, if receiving apparatuses 902 and 904 are in Japan and receiving apparatus 903 is in the United States of America, a packet is transmitted from receiving apparatus 902 in Japan to receiving apparatus 903 in the U.S. and from receiving apparatus 903 in the U.S. to receiving apparatus 904 in Japan.

In this way, depending on the delivery order of destination addresses in the receiver list, there is a problem that inefficient delivery is carried out.

To solve this problem, there is a technique as disclosed in Patent Document 1. That is, this technique refers to, in the explicit multicast scheme, rearranging the receiver list to transmit a packet arranged in ascending order of addresses of receiving apparatuses, to descending order. In this way, receiving apparatuses with similar addresses are adjacent in the receiver list, so that it is supposed to be possible to avoid a round-trip of a packet between two points which are geographically distant apart. For example, in FIG. 9(b), addresses are assigned to receiving apparatuses 902 and 904 from the same address domain and an address is assigned to the receiving apparatus in the U.S. from another address domain. For this reason, if transmitting apparatus 901 writes the addresses of the receiving apparatuses in order of addresses, receiving apparatus 904 is listed next to receiving apparatus 902, so that it is supposed to be possible to avoid a round-trip of a packet between Japan and the U.S.

However, when multimedia data is transmitted by the explicit multicast scheme, if network congestion occurs, a receiving apparatus is not able to receive multimedia data stably, and so quality of images and speech significantly deteriorates. For this reason, it is important to avoid congestion. However, in the explicit multicast scheme, transmission rate control is not defined, and so, even if congestion occurs, it is not possible to avoid congestion by controlling a transmission rate.

TFRC (TCP Friendly Rate Control) that uses feedback information is known as the transmission rate controlling method (see Non-Patent Document 2). This "TFRC" refers to increasing the transmission rate until packet loss occurs and decreasing the transmission rate when packet loss occurs. By this means, the receiving apparatus is able to carry out transmission at a suitable transmission rate.

Then, transmission rate control applying TFRC to communication that employs the explicit multicast scheme is studied, and SICC (Sender Initiated Congestion Control) is proposed (see Non-Patent Document 3).

FIG. 11 is a packet delivery diagram showing operation of SICC.

In FIG. 11, a transmitting apparatus sets in advance a plurality of classes to which different transmission rates are assigned. According to SICC, upper limit B (bps) of the transmission rate is set and three classes that include ½ class and ¼ class are provided by lowering by ½ than upper limit B. The transmitting apparatus classifies receiving apparatuses into classes and transmits on a per class basis a packet that stores in the header the destination addresses of receiving apparatuses belonging to each class.

To which class a receiving apparatus belongs is determined by an available band for each receiving apparatus. That is, according to the TFRC requirement, the transmitting apparatus receives information, fed back from each receiving apparatus to the transmitting apparatus, including the loss event rate, the time the received packet is transmitted, from the transmitting apparatus and the band in which the receiving apparatus is able to receive the packet, and estimates the available band for each receiving apparatus based on these items of feedback information. Then, based on the estimated available bands for receiving apparatuses, the transmitting apparatus classifies receiving apparatuses into classes in which transmission rates are set such that the available band can be utilized at maximum.

Further, similar to TFRC, the processing of classifying receiving apparatuses into classes is carried out by the transmitting apparatus each time feedback information is received from receiving apparatuses, so that it is possible to dynamically classify receiving apparatuses into classes suitable for available bands according to network conditions. In this way, each receiving apparatus is classified into either one of classes and the transmitting apparatus transmits a packet on a per class basis, so that it is possible to realize transmission rate control matching the network condition of each receiving apparatus.

Patent Document 1: Japanese Patent Application Laid-Open No. 2004-120222

Non-Patent Document 1: Y. Imai, M. Shin and Y. Kim, "XCAST6: eXplict Multicast on IPv6," IEEE/IPSJ SAINT2003 Workshop 4, IPv6 and Applications, Orland, January, 2003.

Non-Patent Document 2: M. Handley et al., "TCP Friendly Rate Control (TFRC): Protocol Specification," RFC 3448, Internet <URL: http://www.faqs.org/rfcs/rfc3448.html>

Non-Patent Document 3: "Proposal for Congestion Control Method on Sender Initiated Multicast," Eiichi Muramoto, Takahiro Yoneda, Fumiaki Suzuki, Yoshihiro Suzuki, Atsushi Nakamura, Internet conference 2003 memoir, pp 5 to 10, October 2003.

DISCLOSURE OF INVENTION

Problems to be Solved by the invention

However, according to the conventional scheme, when a receiving apparatus with low transmission capability is listed in an upper part of the receiver list, there is a problem that the receiving apparatus with low transmission capability has negative influences on subsequent receiving apparatuses with high transmission capability.

FIG. 10(a) illustrates this operation.

In FIG. 10(a), when transmitting a packet to receiving apparatuses 902 to 904, transmitting apparatus 901 writes the delivery order from receiving apparatus 902, receiving apparatus 904 to receiving apparatus 903, in the receiver list and stores this delivery order in the option header. At this time, when the access line for receiving apparatus 902 is low speed, for example 64 kbps, and the access line for receiving apparatus 904 is high speed, for example, 100 Mbps, if 1 Mbps stream outputted from transmitting apparatus 901 is outputted, packet loss occurs in the access line for receiving apparatus 902. Further, data delivered to receiving apparatus 902 and subsequent apparatuses are limited to data that receiving apparatus 902 is able to receive, and, therefore, even if receiving apparatus 904 has high transmission capability, receiving apparatus 904 is able to receive only data with defects in a packet.

Further, transmission control is carried out based on TRFC according to transmission capability of receiving apparatus 902 that receives the packet with defects, and so a receiving apparatus listed in the lower part of the receiver list than receiving apparatus 902, carries out communication in a low transmission band even though the receiving apparatus has high transmission capability.

Further, as shown in FIG. 10(b), even if receiving apparatus 902 belongs to a lower class and receiving apparatuses 903 and 904 are classified in an upper class, receiving apparatus 904 with higher transmission capability is likely to be classified into a class with lower transmission capability due to temporary network congestion. In this case, when receiving apparatus 904 that originally has high transmission capability is listed subsequent to receiving apparatus 902 that belongs to a lower class and has low transmission capability, if network congestion is recovered, there is a problem that receiving apparatus 904 is influenced by receiving apparatus 902 with lower transmission capability and is not able to go up to the upper class.

It is an object of the present invention to provide a transmitting apparatus that enables explicit multicast scheme communication where a receiving apparatus with low transmission capability that is listed in an upper part of the receiver list does not have negative influences on receiving apparatuses with higher transmission capability.

Means for Solving the Problem

The transmitting apparatus according to the present invention has functions for carrying out communication according to SICC and rearranging the receiver list according to transmission capability of receiving apparatuses prior to delivering packets using the receiver list.

To be more specific, by estimating the available band based on feedback information from each receiving apparatus and rearranging the receiver list based on this available band, it is possible to, when network congestion is recovered, realize that the influence on the receiving apparatus with high transmission capability by a receiving apparatus with low transmission capability is little.

The transmitting apparatus according to the present invention that has a function for delivering the same packet to a plurality of receiving apparatuses through a unicast route using a receiver list showing a delivery order for the plurality of receiving apparatuses connected with a network, has: a receiver list rearranging section that rearranges the delivery order shown in the receiver list based on the received information related to transmission capability.

Further, the transmitting apparatus according to the present invention that has a function for delivering a same packet to a plurality of receiving apparatuses through a unicast route using a receiver list showing a delivery order for the plurality of receiving apparatuses connected with a network, has: a receiver capability estimating section that estimates an available band for a receiving apparatus from information related to transmission capability received from the receiving apparatus; and a receiver list rearranging section that rearranges the delivery order listed in the receiver list in order from the highest available band, based on the available bands.

In this case, the transmitting apparatus according to the present invention that has a function for delivering a same packet to a plurality of receiving apparatuses through a unicast route using a receiver list showing a delivery order for the plurality of receiving apparatuses connected with a network, has: a receiver capability estimating section that estimates an available band for a receiving apparatus from information related to transmission capability received from the receiving apparatus; a receiver classifying section that classifies the receiving apparatus into a class based on the available band; and a receiver list rearranging section that rearranges the delivery order listed in the receiver list per class in order from the highest available band.

In this way, the transmitted packet is sequentially transferred from a receiving apparatus with high transmission capability to a receiving apparatus with low transmission capability, so that a subsequent receiving apparatus is able to prevent a packet from being received at a transmission rate lower than the transmission capability of the subsequent receiving apparatus by receiving influences of a receiving apparatus with lower transmission capability.

Further, in the transmitting apparatus according to the present invention, the receiver list rearranging section rearranges a delivery order based on information related to transmission capability received at a receiving section.

In this way, information measured by the receiving apparatus is used as is, so that it is possible to decide transmission capability that cannot be estimated.

The transmitting apparatus according to the present invention further has a measuring section that carries out peer-to-peer transmission of a measuring packet for measuring a transmission rate for the receiving apparatus, to the receiving apparatus, and has a configuration in which: the receiver capability estimating section that estimates the available band for the receiving apparatus based on the information related to the transmission capability shown in a response packet in response the measuring packet; the receiver classifying section classifies the receiving apparatus into a class based on the available band; and the receiver list rearranging section rearranges the delivery order shown in the receiver list in order from the highest available band.

In this way, the transmitting apparatus is able to learn the essential transmission capability of the receiving apparatus that is not influenced by the transmission rate due to the delivery order, so that it is possible to accurately determine the delivery order.

Further, information related to transmission capability that is acquired from a receiving apparatus by the transmission apparatus according to the present invention is at least one of a loss event rate measured by the receiving apparatus, a time a packet is transmitted from the transmitting apparatus or an actual receiving rate at which the receiving apparatus is able to receive the packet.

In this way, the transmitting apparatus is able to rearrange the delivery order based on these items of information.

Further, the receiver capability estimating section of the transmitting apparatus according to the present invention estimates the available band further using a round-trip time determined by a time the packet is transmitted from the transmitting apparatus and a time the packet from the receiving apparatus is received.

In this way, the transmitting apparatus is able to utilize a technique for estimating the maximum transmission rate based on a scheme utilizing the fact that the packet interval is proportional to the reciprocal of the band and rearrange the delivery order using the estimated band. Further, a scheme utilizing the fact that a packet interval is proportional to the reciprocal of the band includes the packet paler measuring method or the packet train measuring method specified by reference, "Bprobe and cprobe," http://cs-people.bu.edu/carter/tools/Tools.html, 1996, B. Carter, or the packet train measuring method.

Further, information related to transmission capability that is acquired by the transmission apparatus according to the present invention is at least one of a loss event rate measured by the receiving apparatus, a time a packet is transmitted from the transmitting apparatus or an effective rate at which the receiving apparatus is able to receive the packet, and the receiver list rearranging section rearranges the delivery order further using a round trip time determined by a time the packet is transmitted from the transmitting apparatus and a time a packet from the receiving apparatus is received.

In this way, the transmitting apparatus is able to utilize a transmission controlling packet based on the TFRC requirement, estimate a band based on the band estimation scheme according to TFRC and rearrange the delivery order in order of estimated bands.

Further, when a predetermined time passes from a time the receiver classifying section classifies the receiving apparatus into a class, the receiver list rearranging section of the transmitting apparatus according to the present invention moves the delivery order for the receiving apparatus to the bottom of the receiver list listing the receiving apparatus.

In this way, a receiving apparatus listed in a lower part of the receiver list is shifted to an upper part, so that the receiving apparatus listed in the lower part is able to change classes without the transmission rate being limited by other receiving apparatuses listed in the upper part.

The transmitting method for delivering a same packet to a plurality of receiving apparatuses through a unicast route using a receiving list showing the plurality of receiving apparatuses connected with a network, includes: at the transmitting apparatus, receiving information related to transmission capability included in a packet from a receiving apparatus; rearranging a delivery order for the plurality of receiving apparatuses based on the information related to transmission capability; and delivering the packet to which the rearranged receiver list is added, through the unicast route according to the receiver list.

Further, the transmitting method for delivering a same packet to a plurality of receiving apparatuses through a unicast route using a receiving list showing the plurality of receiving apparatuses connected with a network, includes: receiving information related to transmission capability included in a packet of a receiving apparatus; estimating an available band for the receiving apparatus from the information related to transmission capability; rearranging a delivery order listed in the receiver list in order from the highest available band based on the available band; and transmitting the packet to which the receiver list is added.

In this case, the transmitting method according to the present invention for delivering the same packet to a plurality of receiving apparatuses connected with the network through a unicast route, includes: receiving information related to transmission capability for receiving a packet from each receiving apparatus; and estimating the available band for each receiving apparatus from this information. Then, the transmission method according to the present invention may further include: classifying the receiving apparatus into a class based on the estimated available band; registering the receiver list on a per class basis; and further transmitting a packet by arranging the delivery order in the receiver list in order from the highest available band and adding the receiver list to the packet.

In this way, the packet transmitted from the transmitting apparatus is transferred sequentially from the receiving apparatus with high transmission capability to the receiving apparatus with low transmission capability, so that a subsequent receiving apparatus is able to avoid receiving a packet at a transmission rate lower than the transmission capability of the subsequent receiving apparatus by being influenced by the receiving apparatus with lower transmission capability.

Advantageous Effect of the Invention

The transmitting apparatus according to the present invention enables explicit multicast scheme communication in which a receiving apparatus with low transmission capability listed in an upper part of the receiver list does not have negative influences on the receiving apparatus with higher transmission capability.

BRIEF DESCRIPTION OF DRAWINGS

FIG. 3 shows a data structure of a receiver list according to Embodiment 1 of the present invention;

FIG. 4 shows a data structure of the receiver list according to Embodiment 2 of the present invention;

EXPLANATION OF REFERENCE NUMERALS

Figure 1:
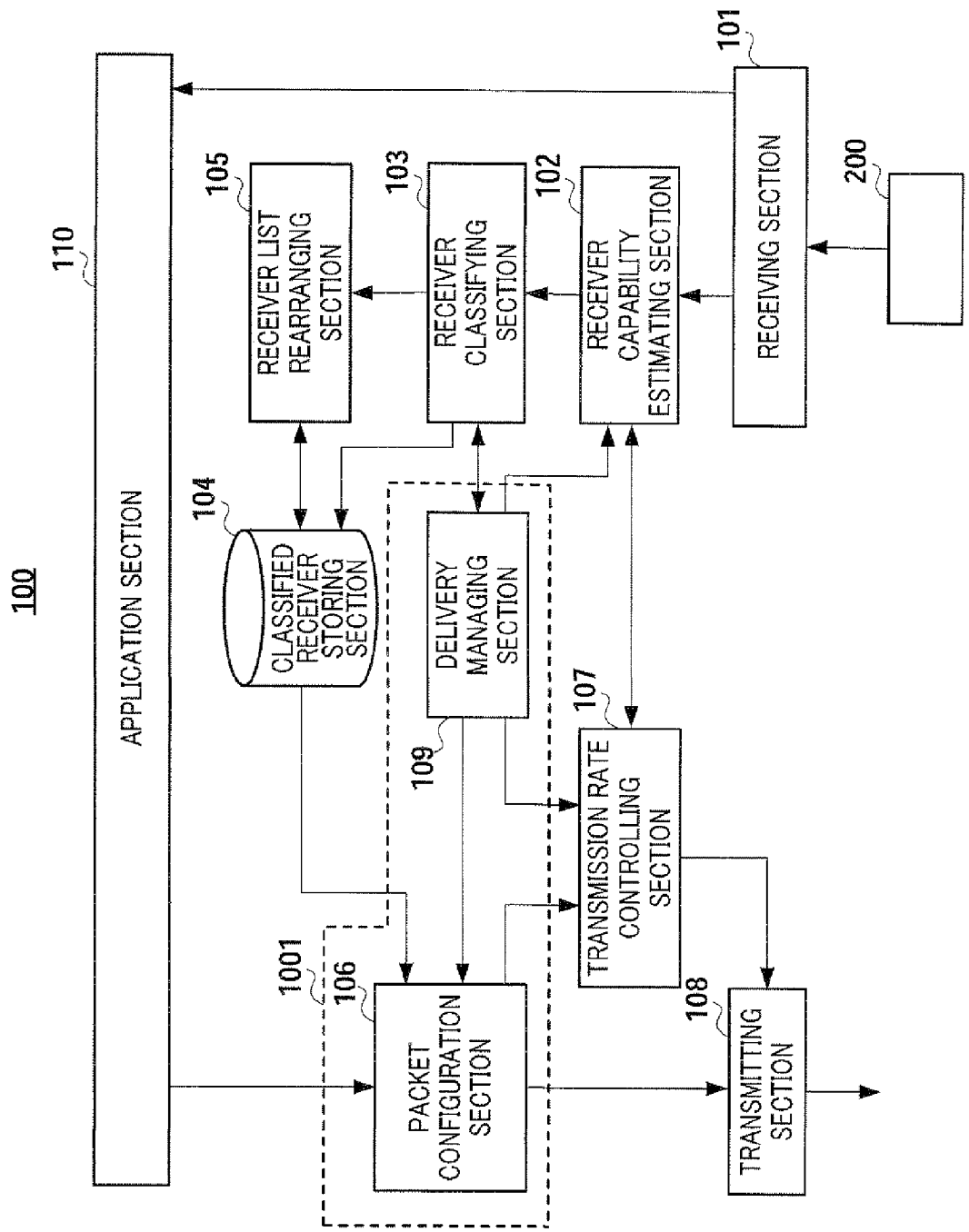
FIG. 1 is a block diagram showing a configuration of a transmitting apparatus according to Embodiment 1 of the present invention.

101 Receiving section
102 Receiver capability estimating section
103 Receiver classifying section
104 Classified receiver storing section
105 Receiver list rearranging section
106 Packet configuration section
107 Transmission rate controlling section
109 Delivery managing section
110 Application section
901 Transmitting apparatus
902, 903, 904 Receiving apparatus

BEST MODE FOR CARRYING OUT THE INVENTION

Hereinafter, embodiments of the present invention will be described with reference to the accompanying drawings.

Embodiment 1

FIG. 1 shows a configuration of a transmitting apparatus that carries out communication using SICC according to this embodiment of the present invention.

Figure 2:
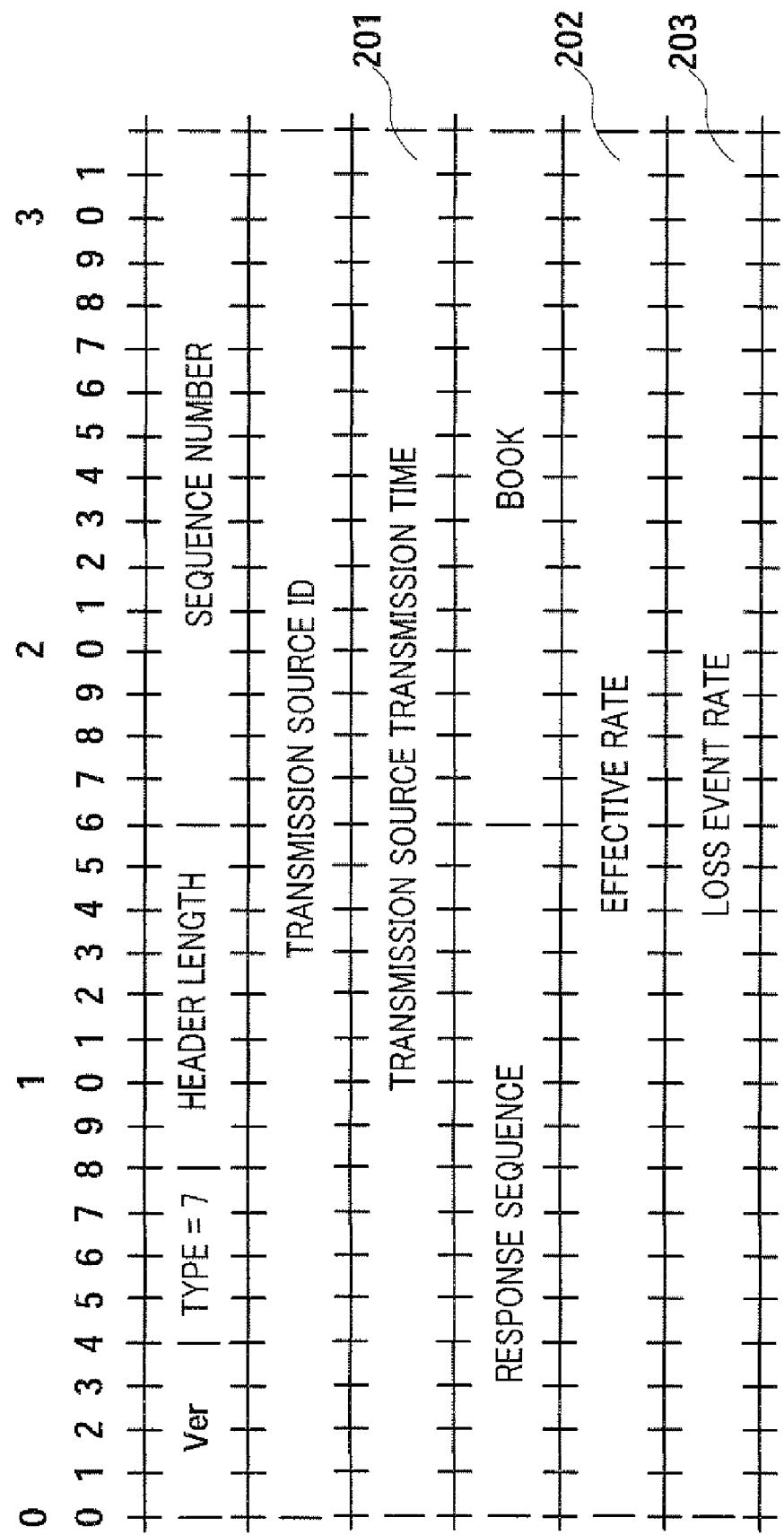
FIG. 2 shows a data format of a receiver report packet according to Embodiment 1 of the present invention.

In FIG. 1, application section 110 executes an application in transmitting apparatus 100, and receiving section 101 receives a packet and transmits the payload to application section 110. Further, receiving section 101 receives a receiver report packet from, for example, receiving apparatus 200 and extracts feedback information. FIG. 2 shows the data format of this receiver report packet.

In FIG. 2, feedback information includes time 201 the packet is transmitted from the transmitting apparatus (hereinafter "transmission source transmission time"), effective rate 202 at which the receiver apparatus is able to receive a packet and loss event rate 203 measured by the receiving apparatus.

Receiver capability estimating section 102 estimates transmission capability of the receiving apparatus applying the band estimation scheme defined according to TFRC, to feedback information received from receiving section 101.

Receiver classifying section 103 compares the transmission capability of the receiving apparatus estimated at reception capability estimating section 102 and the transmission rate specified in advance, determines the class to which the receiving apparatus belongs and records the class in classified receiver storing section 104. In this embodiment, maximum transmission rate B (bps) is set for transmitting apparatus 100. Three classes of class 1 to class 3 that set B/2 (bps) and B/4 (bps) as thresholds are provided. Then, a receiver list is generated per class.

FIG. 3 shows a data structure of a receiver list. In FIG. 3, destination address 301 of each receiving apparatus and maximum transmission rate 302 of each receiving apparatus are recorded in order of transmission.

Receiver list rearranging section 105 rearranges the receiver list of the specified class in order of receiving apparatuses with high capability. To be more specific, receiver list rearranging section 105 reads the receiver list stored in classified receiver storing section 104 and rearranges address 301 of each receiving apparatus in order from greatest maximum transmission rate 302. Then, receiver list rearranging section 105 writes the updated receiver list in classified receiver storing section 104.

Packet configuration section 106 configures the packet header of the explicit multicast scheme and stores the receiver list in the option header of this header or payload. The format of this transmission packet utilizes the format that writes IP addresses together in the option header as in the format defined by Japanese Patent Application Laid-Open No. HEI6-326713 and Japanese Patent Application Laid-Open No. 2000-354063, the format defined by Japanese Patent Application Laid-Open No. HEI10-98464 and the format shown in Japanese Patent Application Laid-Open No. 2001-7835 and reference L. Aguilar, "Datagram Routing for Internet Multicasting," Sigcomm84, March 1984. Further, content that is received from application section 110 and is to be transmitted to each receiving apparatus is recorded in the payload.

Transmission rate controlling section 107 controls the timing for transmitting a packet such that the time interval for transmitting the packet is controlled according to the class of the receiver list.

Transmitting section 108 transmits the packet at the timing specified by transmission rate controlling section 107. Transmitting section 108 has a function for delivering a packet.

Delivery managing section 109 commands receiver classifying section 103, packet configuration section 106 or transmission rate controlling section 107 to initialize the receiver list in order to carry out explicit multicast, or update the receiver list on a regular basis.

Further, packet configuration section 106 and delivery managing section 109 form measuring section 1001 according to the present invention. Measuring section 1001 carries out peer-to-peer transmission of a measuring packet for measuring the transmission rate of each receiving apparatus, to each receiving apparatus. Further, the measuring packet, for example, may be an independent packet or may be used by adding a flag (that relates to a measuring packet) in the header of an application packet. That is, the application packet may serves as a measuring packet. The packet application is transmitted from application section 110 through packet configuration section 106.

Figure 5:
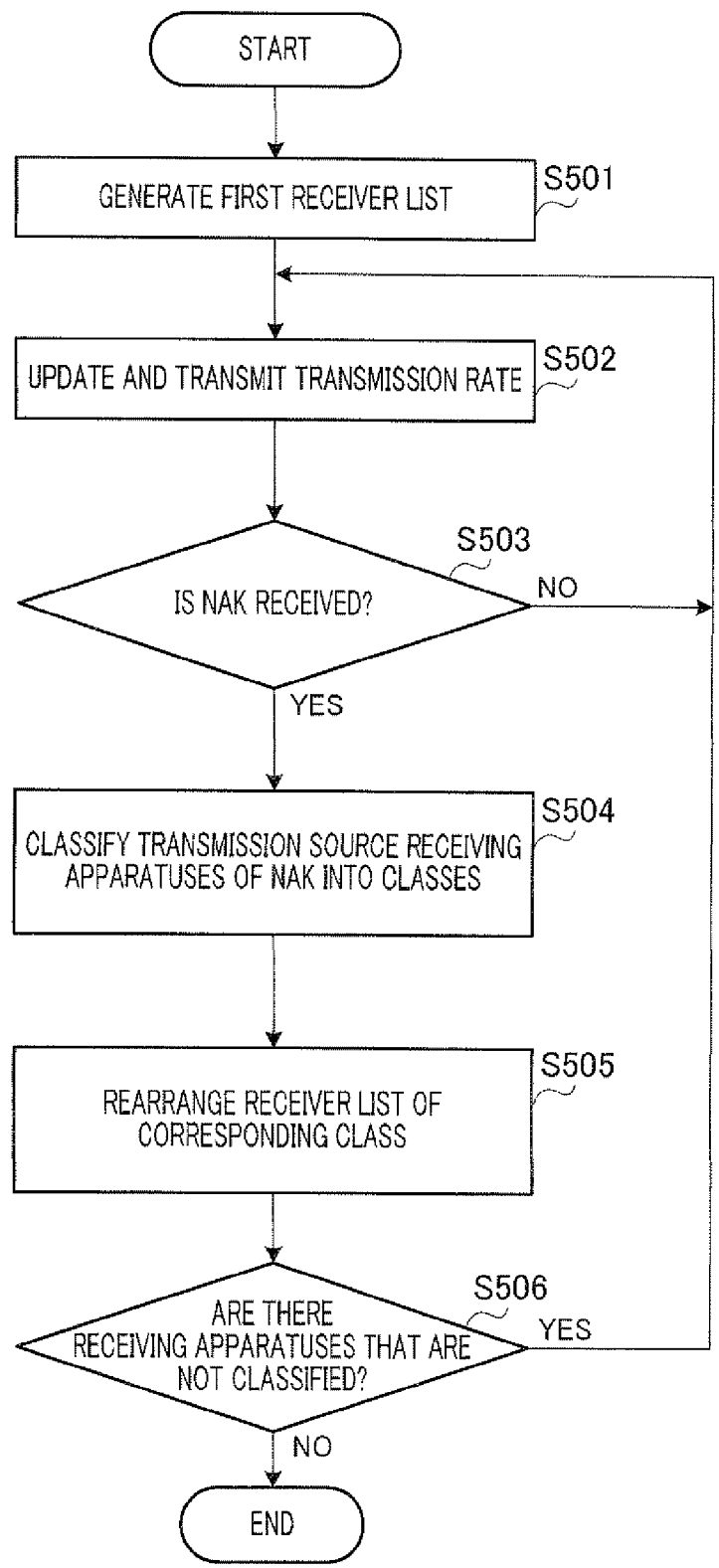
FIG. 5 is a flowchart showing the first measurement operation of the transmitting apparatus according to Embodiment 1 of the present invention.

Next, the operation and advantage of the transmitting apparatus according to this embodiment will be described with reference to the accompanying drawings. FIG. 5 is a flowchart showing the first measuring operation of the transmitting apparatus according to the present invention.

In FIG. 5, first, delivery managing section 109 commands receiver classifying section 103 to start the first measurement processing, and receiver classifying section 103 registers all receiving apparatuses registered as transmission destinations in the lowest class 1 (step S501). In the receiver list generated at this time, destination addresses of receiving apparatuses are arranged in ascending order or in descending order. Further, delivery managing section 109 reports to receiver capability estimating section 102 that the first measurement is started. Further, delivery managing section 109 sets, for example, 8 s/GRTT (bit/second), as the first transmission rate for transmission rate controlling section 107 and commands transmission rate controlling section 107 to start a "slow start." Further, "GRTT (second)" is the maximum round-trip time and "s" is the packet size (byte). Further, delivery managing section 109 commands packet configuration section 106 to generate the first measurement packet and transmits the generated first measurement packet to transmitting section 108. This first measurement packet uses a scheme utilizing the fact that a packet interval is proportional to the reciprocal of the band as in the packet paier measuring method or the packet train measurement method specified in the above reference B. Carter, "Bprobe and cprobe." Further, the same scheme is used as the scheme, which is specified in the reference S. M. Bellovin, "A Best-Case Network Performance Model," http://www.research.att.com/smb/papers/net-meas.pdd, February 1992, for estimating a band by transferring a packet between clock-synchronized hosts or the band estimation scheme according to TFRC, which is specified in reference RFC3448. Upon reception of a report of a transmission timing from transmission rate controlling section 107, transmitting section 108 transmits the first measurement packet to each receiving apparatus.

Next, transmission rate controlling section 107 increases the transmission rate by 8 s/GRTT (bit/second) every GRTT second, and reports the transmission timing to transmitting section 108 (step S502).

Next, when receiving a NAK packet, receiving section 101 reports reception of the NAK packet to receiver capability estimating section 402 (step S503). Because receiver capability estimating section 402 is in the middle of the first measurement, receiver capability estimating section 402 inquires the transmission rate at this time to transmission rate controlling section 107. Then, receiver capability estimating section 402 determines the transmission rate at this time as the maximum transmission rate of each receiving apparatus that is the transmission source of the NAK packet. Further, receiver capability estimating section 402 reports the address and the maximum transmission rate of each transmission source receiving apparatus, to receiver classifying section 103. Upon reception of this report, receiver classifying section 403 registers the reported address in the receiver list of the corresponding class in classified receiver storing section 104 (step S504). Further, when the classified class is not the lowest class 1, the corresponding address is deleted from class 1 of the receiver list.

Next, receiver classifying section 103 reports a class with a changed receiver list to receiver list rearranging section 105. Upon reception of this report, receiver list rearranging section 105 rearranges the receiver list of the corresponding class in order from the greatest maximum transmission rate (step S505).

On the other hand, in step S503, while receiving section 101 does not receive the NAW packet, transmission rate controlling section 107 continues updating the transmission rate (steps S503 and S504).

Next, receiver classifying section 103 checks whether there are receiving apparatuses with unregistered maximum transmission rate 302 among receiving apparatuses set by default in the receiver list of class 1 (step 506). When there are receiving apparatuses with unregistered maximum transmission rate 302, the flow returns to step S502 and, when there is no receiving apparatus with unregistered maximum transmission rate 302, receiver classifying section 103 reports the end of this first measurement processing to delivery managing section 109. Upon reception of this report, delivery managing section 109 reports the end of the first measurement processing to packet configuration section 106, transmission rate controlling section 107 and receiver capability estimating section 102.

In this way, upon the first classification of receiving apparatuses into classes, the transmitting apparatus rearranges the receiver list in order of high transmission capability, so that it is possible to cancel limitation, which occurs when carrying out explicit multicast, to the transmission rate by other receiving apparatuses listed in an upper part of the receiving list.

Next, transmission control processing according to the TFRC requirement that is carried out when the transmitting apparatus carries out packet transmission of normal content will be described later.

Figure 6:
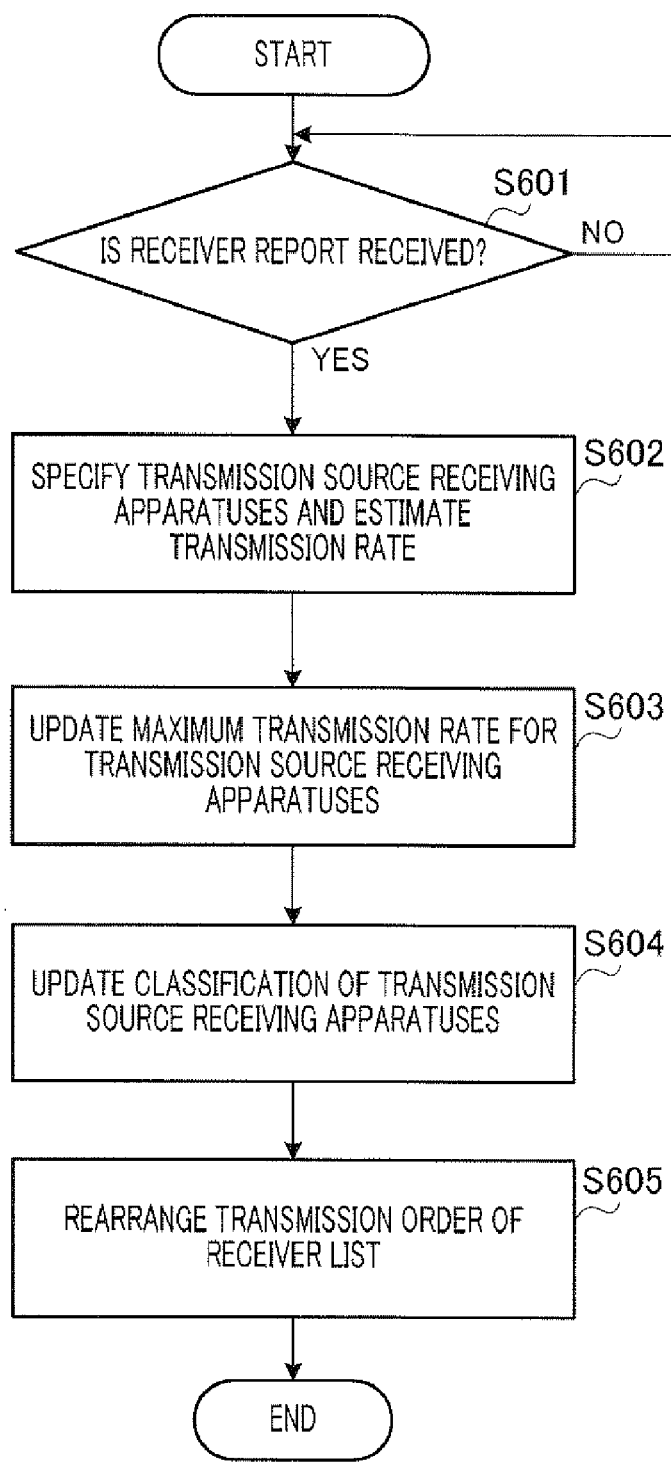
FIG. 6 is a flowchart showing transmission control processing of the transmitting apparatus according to Embodiment 1 of the present invention.

FIG. 6 is a flowchart showing transmission control processing by the transmitting apparatus according to this embodiment.

In FIG. 6, when receiving the packet, receiving section 101 checks whether a receiver report is included (step S601).

When the receiver report is not included, receiving section 101 extracts the payload, delivers the payload to application section 110 and returns to the stand-by mode.

On the other hand, when the receiver report is included, receiving section 101 reports feedback information with the address of each transmission source receiving apparatus, to receiver capability estimating section 102. Upon reception of this report, receiver capability estimating section 102 finds the maximum transmission rate based on equation 1, which is an algorithm specified according to TFRC (step S602). Then, receiver capability estimating section 102 reports the determined maximum transmission rate (that is, available band) and the address of each transmission source receiving apparatus, to receiver classifying section 103.

(Equation 1)

$$X = \frac{8s}{R\sqrt{2bp/3} + T\_RTO(3 \times \sqrt{3bp/8}) \times p \times (1 + 32p^2)} \quad [1]$$

Here, R is the round-trip time (second), p is the loss event rate, s is the packet size (byte), b is the positive response unit of TCP and T_RTO is the timeout value (=4×R) of TCP).

Further, the round-trip time used in equation 1 is determined by transmission source transmission time 201 included in feedback information and the time the reception report packet is received.

Next, receiver classifying section 103 reads maximum transmission rate 302 of corresponding destination address 301 from classified receiver storing section 104 and compares maximum transmission rate 302 and the maximum transmission rate reported from receiver capability estimating section 102. Then, if the registered maximum transmission rate is higher than the reported maximum transmission rate, receiver classifying section 103 keeps the registered transmission rate as is, because the maximum transmission rate this time is more likely to have been delayed due to the access line for a previous receiving apparatus to which a packet is delivered earlier than the access line for the receiving apparatus.

On the other hand, if the reported maximum transmission rate is higher than the registered maximum transmission rate, the registered maximum transmission rate is replaced with the reported maximum transmission rate (step S603).

Further, receiver classifying section 103 compares the new maximum transmission rate and the threshold for classification and changes class registration to a corresponding class (step S604). To be more specific, when the maximum transmission rate of a receiving apparatus becomes higher than the determined threshold, receiver classifying section 103 deletes the address of the receiving apparatus from the receiver list of the class to which the receiving apparatus belonged, and adds the address in the receiver list of an upper class. Then, receiver classifying section 103 reports a class with a changed receiver list occurs to receiver list rearranging section 105.

Next, upon reception of this report, receiver list rearranging section 105 rearranges the receiver list of the corresponding class in order from the greatest maximum transmission rate (step S605).

In this way, in normal communication, the transmitting apparatus rearranges the receiver list in order of high transmission capability when changing the class to which the receiving apparatus belongs, so that it is possible to cancel limitation, which occurs when carrying out explicit multicast, to the transmission rate by other receiving apparatuses listed in an upper part of the receiver list.

Next, transmission rate measurement processing, carried out by the transmitting apparatus on a regular basis, will be described.

Figure 7:
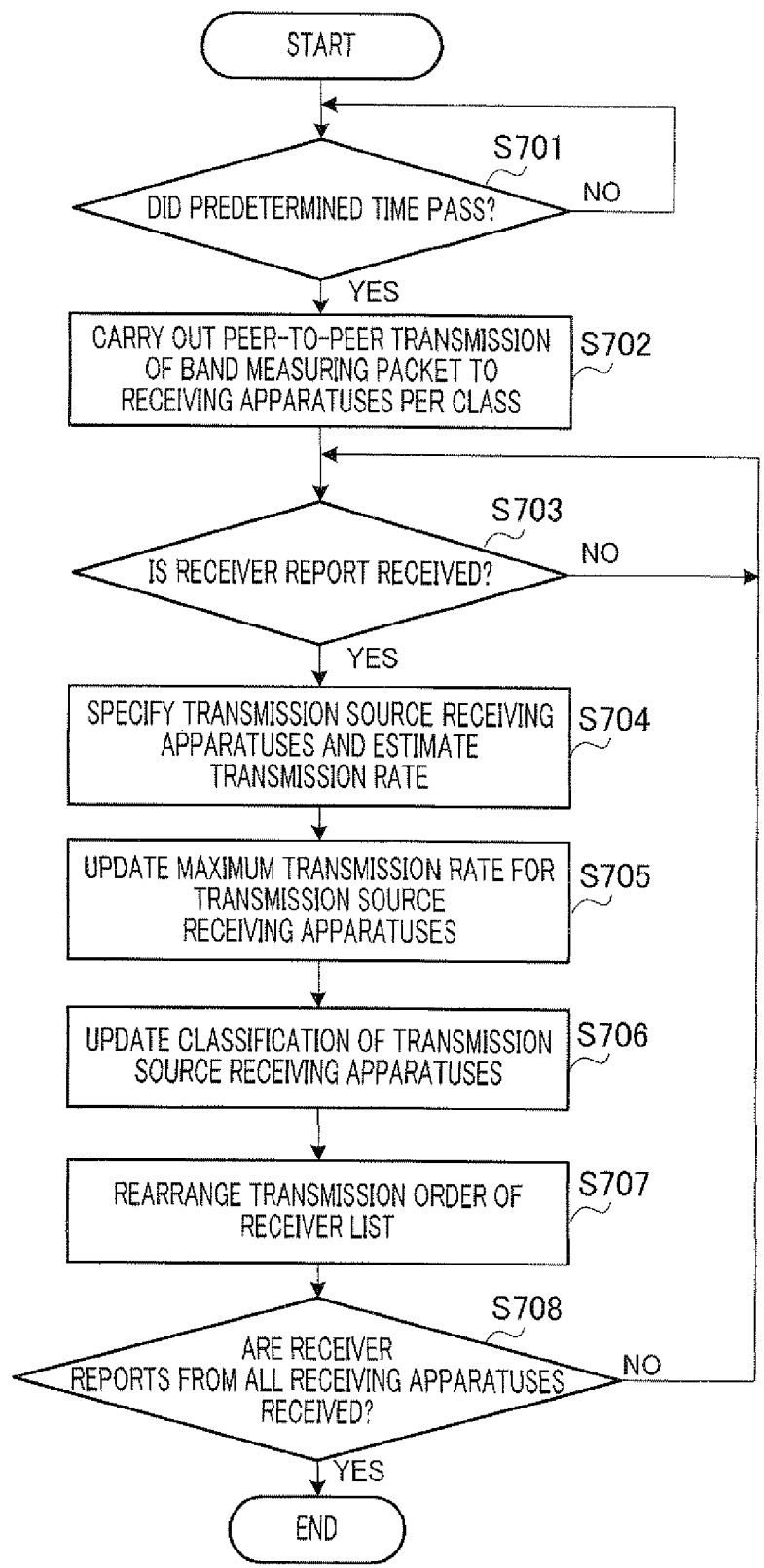
FIG. 7 is a flowchart showing transmission rate measurement processing of the transmitting apparatus according to Embodiment 1 of the present invention.

FIG. 7 is a flowchart showing transmission rate measurement processing by the transmitting apparatus according to this embodiment. Further, this transmission rate measurement processing is carried out per class.

In FIG. 7, first, after the first measurement processing is finished, delivery managing section 109 commands packet configuration section 106 and receiver classifying section 103 to start transmission rate measurement processing on a regular basis (step S701). With respect to the command, packet configuration section 106 generates a band measuring packet. At this time, packet configuration section 106 reads the receiver list from classified receiver storing section 104 on a per class basis, duplicates band measuring packets that set the registered destination addresses as destination and transmits the band measuring packets to transmitting section 108 sequentially. Further, packet configuration section 106 reports the class of transmission destination, to transmission rate controlling section 107. Up on reception of this report, transmission rate controlling section 107 reports a timing to transmitting section 108, at the transmission rate of the reported class. Transmitting section 108 transmits the band measuring packet to the receiving apparatus at the reported timing. The transmitting method at this time is peer-to-peer communication from the transmitting apparatus to each receiving apparatus (step S702).

Next, when receiving a packet, receiving section 101 checks whether a receiver report is included (step S703).

When a receiver report is not included, receiving section 101 extracts the payload, delivers the payload to application section 110 and returns to the stand-by mode.

On the other hand, when a receiver report is included, receiving section 101 reports feedback information with the address of each transmission source receiving apparatus, to receiver capability estimating section 102. Upon reception of this report, receiver capability estimating section 102 finds the maximum transmission rate based on equation 1 (step S704). Then, receiver capability estimating section 102 reports the determined maximum transmission rate and the address of each transmission source receiving apparatus, to receiver classifying section 103.

Next, receiver classifying section 103, knowing that the transmission rate measurement is currently in progress, replaces maximum transmission rate 302 of corresponding destination address 301 registered in the receiver list of classified receiver storing section 104 with the reported maximum transmission rate (step S705).

Further, receiver classifying section 103 compares the new maximum transmission rate with the threshold for classification and changes class registration to a corresponding class (step S706). To be more specific, when the maximum transmission rate of a receiving apparatus becomes higher than the determined threshold, receiver classifying section 103 deletes the address of the receiving apparatus from the receiver list of the class to which the receiving apparatus belonged, and adds the address to the receiver list of an upper class. In contrast with this, when capability of the receiving apparatus becomes lower than the threshold, receiver classifying section 103 deletes the address of the receiving apparatus from the receiver list of the class to which the receiving apparatus belonged and adds the address to the receiving list of the lower class. Then, receiver classifying section 103 reports a class with a changed receiver list to receiver list rearranging section 105.

Next, upon reception of this report, receiver list rearranging section 105 rearranges the receiver list of the corresponding class in order from the greatest maximum transmission rate (step S707).

Next, receiver classifying section 103 checks whether receiver reports in response to the band measuring packet are received from all registered receiving apparatuses (step S708), and, if receiver reports are not received, the flow returns to step S703 and receiver classifying section 103 waits for the receiver report to be received.

On the other hand, when receiver reports are not received from all receiving apparatuses, processing is finished.

In this way, the transmitting apparatus independently measures the maximum transmission rate of each receiving apparatus on a regular basis and rearranges the receiver list in order of high transmission capability, so that it is possible to cancel limitation, which occurs when carrying out explicit multicast, to the transmission rate by other receiving apparatuses listed in an upper part of the receiver list.

Further, in transmission control processing carried out at all times or transmission rate measurement processing carried out on a regular basis according to this embodiment, although receiver list rearranging section 105 rearranges the receiver list based on the maximum transmission rate determined based on equation 1 by receiver capability estimating section 102, this embodiment is not limited to this and rearrangement may be carried out based on one of the effective rate, loss event rate and round-trip time of feedback information. Further, numerical values calculated by combining these items of feedback information according to algorithms other than equation 1 may be used.

Further, receiver list rearranging section 105 may rearrange the delivery order in the receiver list based on the maximum transmission rate determined by equation 1 at receiver capability estimating section 102 and other items of information (that relate to transmission capability). Other items of information include the effective rate, loss event rate, round-trip time of feedback information or information that is unique to the model of each receiving terminal, or combination of two or more above items of information.

Information that is unique to the model of each receiving terminal (information that is unique to the model of each receiving terminal) includes, for example, the name of the maker of each receiving terminal, the model of each receiving terminal, the screen size of each receiving terminal or the type of the network interface of each receiving terminal.

When information that is unique to the model of a receiving terminal matches a class, receiver list rearranging section 105 rearranges the receiver list based on the maximum transmission rate determined by equation 1 at receiver capability estimating section 102. That is, receiver list rearranging section 105 classifies receiving terminals (receivers) into classes based on information that is unique to models of receiving terminals. For example, receiving terminals of the same model are classified into the same class.

Then, receiver list rearranging section 105 rearranges the delivery order of these receiving terminals that belong to the same class, based on the maximum transmission rate determined by equation 1 at receiver capability estimating section 102. Receiver list rearranging section 105, for example, sets the receiving terminal with the greatest maximum transmission rate at the top of the delivery order.

Or, after arranging the delivery order of the receiver list based on the above maximum transmission rate, receiver list rearranging section 105 may further rearrange the delivery order of the receiver list based on information that is unique to the model of a receiving terminal. For example, for two receiving terminals that are adjacent (high and low) in the receiver list (see FIG. 3), when the difference between the maximum transmission rates is a given value (that is set in advance) or less, the receiving terminals may be rearranged order from the (for example, largest) screen size. Or, receiver list rearranging section 105 arranges receiving terminals with, for example, the name of the maker or the model specified in advance, in an upper part of the receiver list, based on information of the name of the maker or the model of receiving terminals.

Further, when a session starts, when direct communication is carried out between a receiving terminal and transmitting terminal during the session, or through a specific server (for example, a server that carries out session call control), the transmitting terminal is able to acquire information that is unique to the model of the receiving terminal.

Further, in the first measurement processing of this embodiment, although receiving apparatuses in the receiver list are arranged based on the maximum transmission rate determined by a slow start, this embodiment is not limited to this, and, by measuring the round-trip time between the transmitting apparatus and each receiving apparatus, the effective rate or the number of hops (the number of routers) on the route, it is possible to rearrange receiving apparatuses using these measurement values. By statistically defining the predetermined order as the order of receiving apparatus capability, the receiver list may be rearranged using this predetermined order.

As described above, according to the present invention, receiving apparatuses with high transmission capability are arranged preferentially over receiving apparatuses with low transmission capability as the delivery order of the packet, so that it is possible to prevent the packet from not being delivered to the receiving apparatuses with high transmission capability due to packet loss at receiving apparatuses with low transmission capability. Further, even when receiving apparatuses with high transmission capability are classified into low classes due to temporary network congestion, the maximum transmission rate of each receiving apparatus can be updated by transmission rate measurement processing carried out on a regular basis, so that, when network congestion is recovered, receiving apparatuses with high transmission capability are able to go up to upper classes, and, consequently, it is possible to realize adequate transmission rate control.

Further, although a case has been described above with Embodiment 1 where the transmitting apparatus determines classes to which receiving apparatuses belong at receiver classifying section 103, the delivery order of the receiver list may be rearranged without determining classes. In this case, based on the available band for each receiving apparatus estimated by receiver capability estimating section 102, receiver list rearranging section 105 (transmitting apparatus) may rearrange the delivery order of the receiver list in order from the highest available band. Even in this case, a packet is delivered to each receiving apparatus in order of high transmission capability, so that it is possible to realize adequate transmission rate control.

Further, although a case has been described above with Embodiment 1 where the transmitting apparatus rearranges the delivery order of the receiver list based on the maximum transmission rate of the receiving apparatus or the combination of the maximum transmission rate and transmission capability of each receiving apparatus, the transmitting apparatus may rearrange the delivery order of the receiver list based on transmission capability alone received from each receiving apparatus. In this case, based on transmission capability (the effective rate, loss event rate and round-trip time of feedback information) alone received at receiving section 101 from each receiving apparatus, receiver list rearranging section 105 may rearrange the delivery order (such as, in order from the highest effective rate, in order from the smallest loss event rate and in order from the longest round-trip time) of the receiver list.

Embodiment 2

This embodiment differs from Embodiment 1 in further rearranging the receiver list to which a receiving apparatus belongs based on the time that has passed between the time the class to which the receiving apparatus belongs is updated and the present time, at the transmitting apparatus.

The configuration of the transmitting apparatus according to this embodiment is the same as in the block diagram of FIG. 1, but the data structure of the receiver list in classified receiver storing section 104 and functions of receiver classifying section 103 and receiver list rearranging section 105 are different. These differences will be described later.

FIG. 4 shows the data structure of the receiver list stored in classified receiver storing section 104.

In FIG. 4, the receiver list is formed with destination address 301 of each receiving apparatus, transmission rate 302 of each receiving apparatus and class update time 401 showing the time the class to which each receiving apparatus belongs is updated, and the maximum transmission rate is recorded in the receiver list in order from the greatest maximum transmission rate.

Further, although receiver classifying section 103 classifies receiving apparatuses into three classes based on receiver reports and registers the receiving apparatuses in receiver lists, when registration of receiving apparatuses is further changed to upper classes, receiver classifying section 103 records the point of that time, in class update time 401 of the receiver list.

Further, in addition to functions described in Embodiment 1, receiver list rearranging section 105 further rearranges the receiver list based on the time that has passed between the time registration is changed to an upper class and the present time.

For the transmitting apparatus configured as described above, operation of updating the receiver list and this advantage will be described later. Further, the first measurement operation and transmission rate measurement operation carried out on a regular basis are the same as in Embodiment 1 except that operation for recording the time class update time 401 is registered in the receiver list at receiver list classifying section 103.

Figure 8:
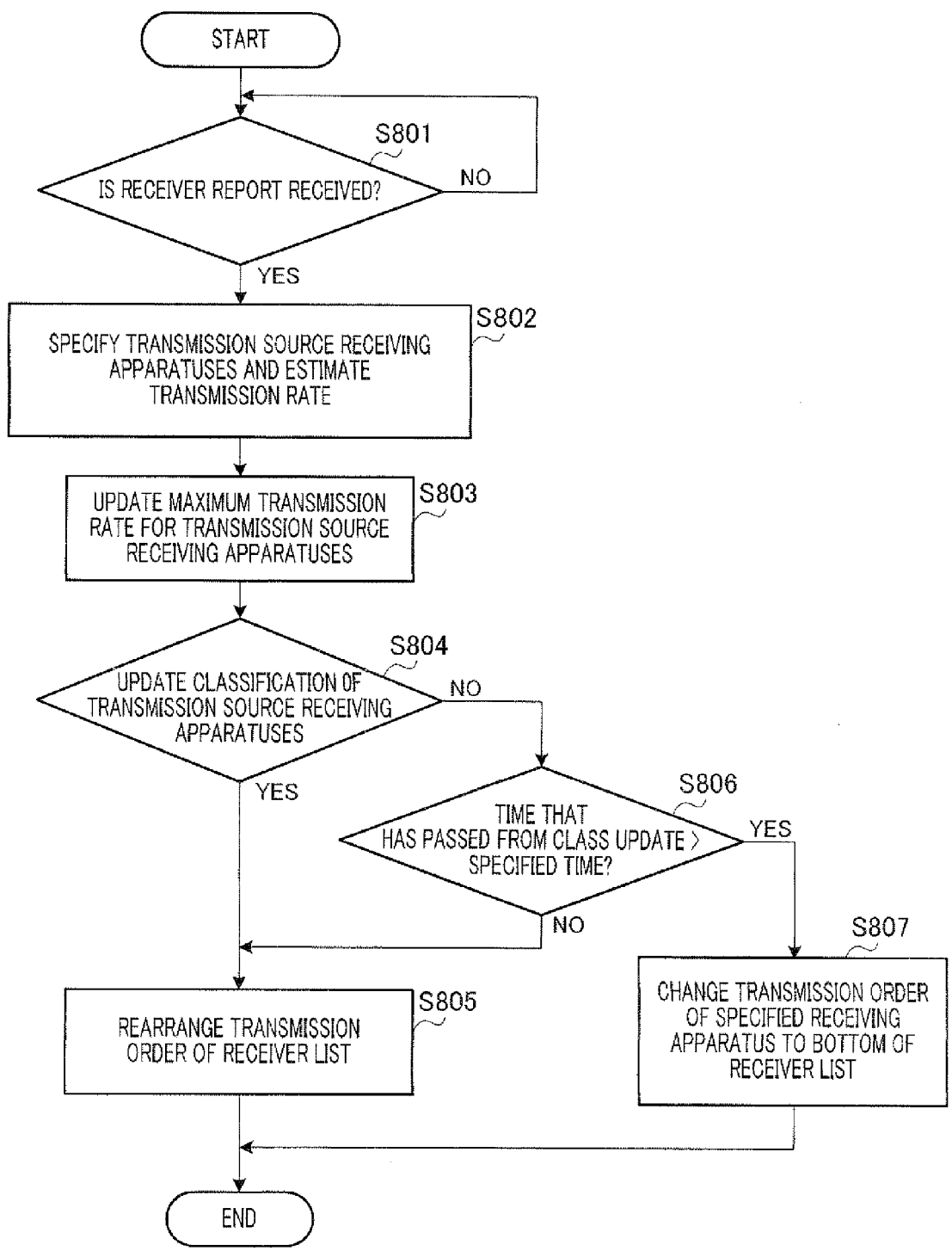
FIG. 8 is a flowchart of transmission rate measurement processing of the transmitting apparatus according to Embodiment 2 of the present invention.
Figure 9A:
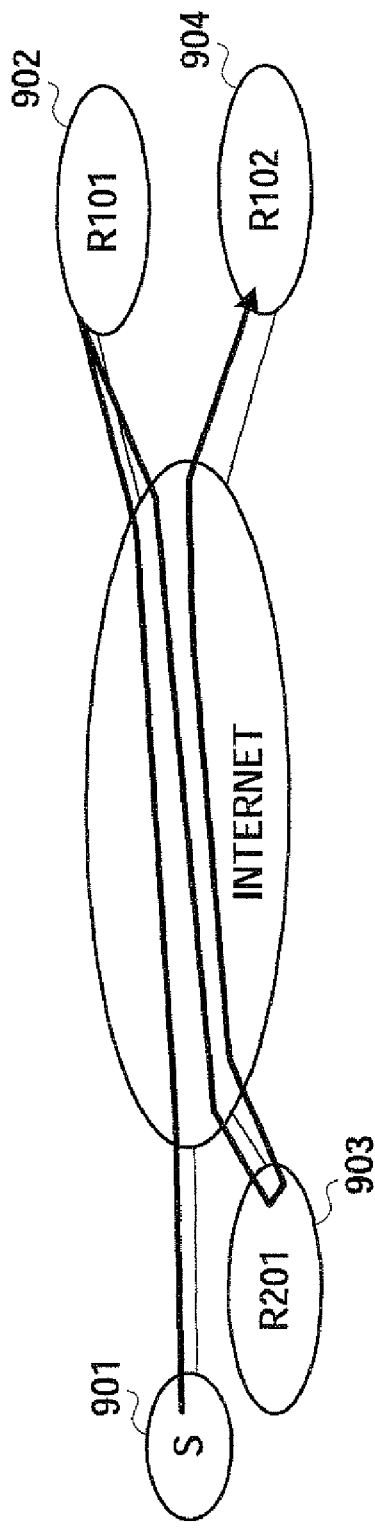
FIG. 9 shows packet delivery according to the conventional explicit multicast scheme.
Figure 9B:
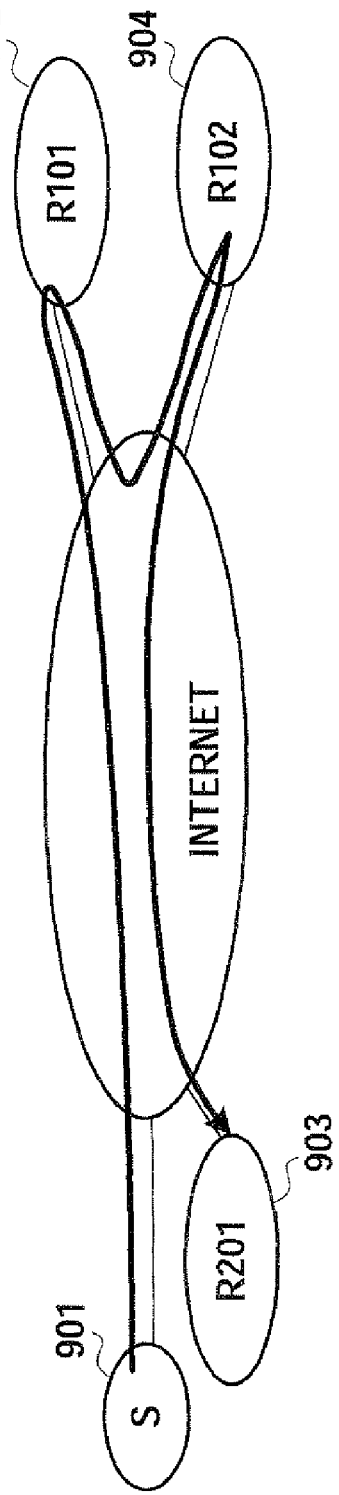
Figure 10A:
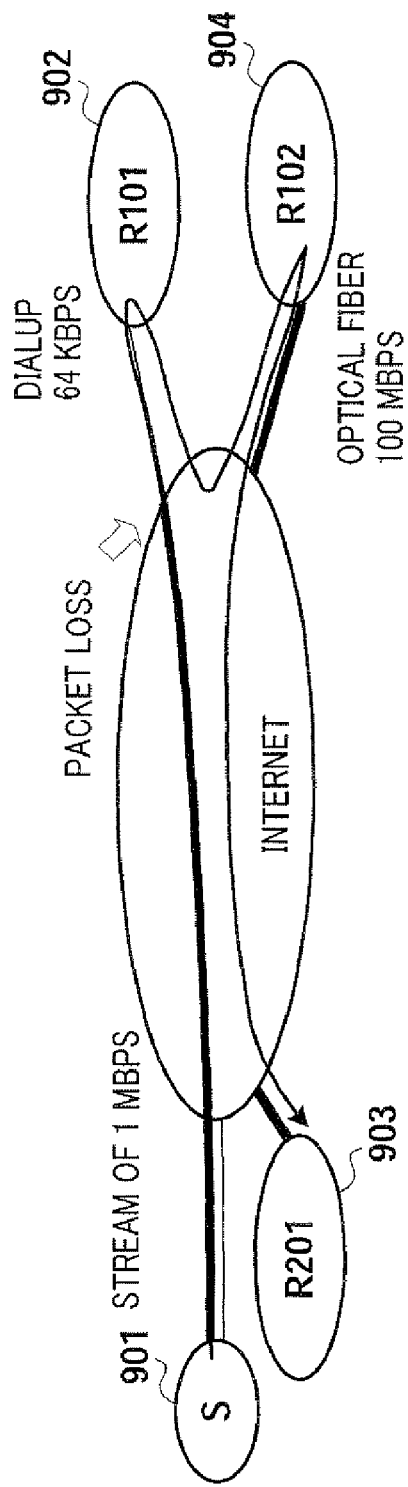
FIG. 10 shows packet delivery according to the conventional explicit multicast scheme.
Figure 10B:
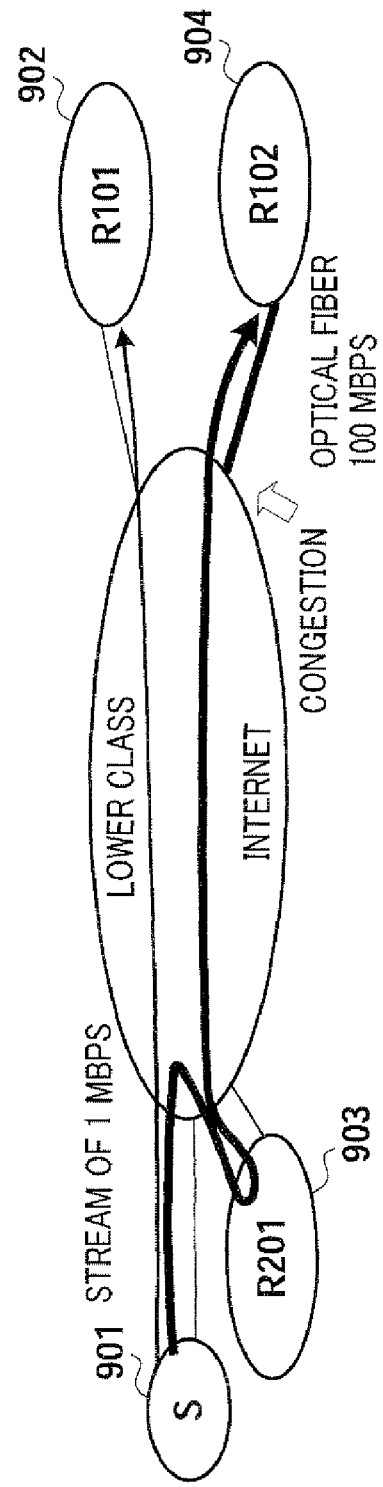
Figure 11:
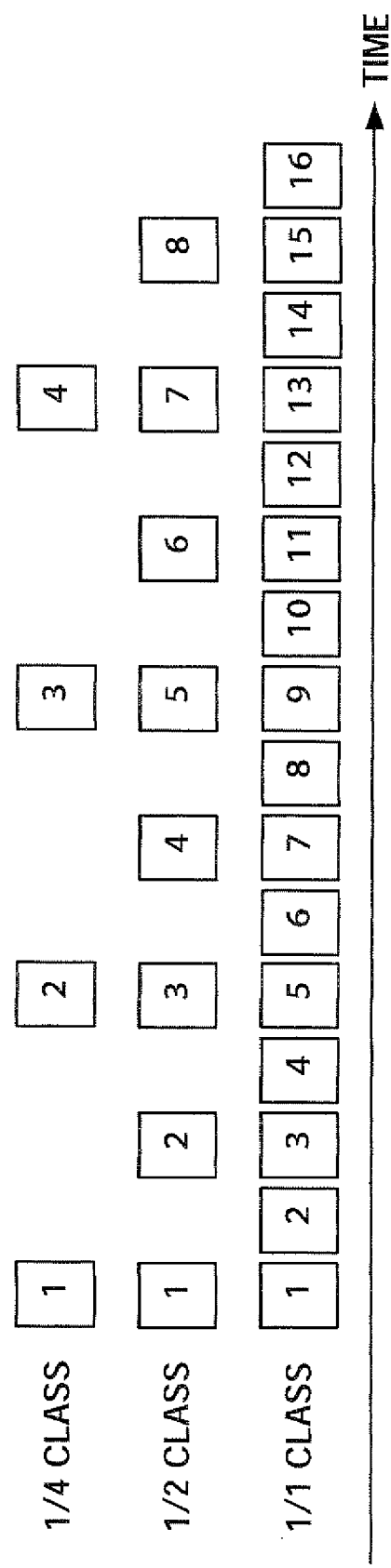
FIG. 11 is a packet delivery diagram showing operation of conventional SICC.

FIG. 8 shows transmission rate measurement processing carried out on a regular basis by the transmitting apparatus according to this embodiment.

In FIG. 8, step S801 to step S803 are the same as step S601 to S603 shown in FIG. 6 of Embodiment 1.

Further, receiver classifying section 103 compares the new maximum transmission rate and the threshold for classification (step S804) and changes class registration to a corresponding class. To be more specific, when the maximum transmission rate of a receiving apparatus becomes higher than the determined threshold, receiver classifying section 103 deletes the address of the receiving apparatus from the receiver list of the class to which the receiving apparatus belonged and adds the address to the receiver list of an upper class. At this time, receiver classifying section 103 records the present time in class update time 401 of the receiver list. Then, receiver classifying section 103 reports a class with a changed receiver list to receiver list rearranging section 105.

Next, upon reception of this report, receiver list rearranging section 105 rearranges the receiver list of the corresponding class in order from the greatest maximum transmission rate (step S805).

On the other hand, in step S804, when receiver classifying section 103 decides that it is not necessary to change the class, receiver classifying section 103 reports the decision result to receiver list rearranging section 105.

Next, receiver list rearranging section 105 refers to the receiver list stored in classified receiver storing section 104 and reads class update time 401 of the transmission source receiving apparatus. Then, receiver list rearranging section 105 calculates the time that has passed between the class update time and the present time and decides whether the time that has passed exceeds the time specified in advance (step S806). When the time that has passed exceeds the specified time, registration of the receiving apparatus is changed to the bottom of the receiver list (step S807), and, when the time that has passed does not exceed the specified time, the flow shifts to step S805.

In this way, the transmitting apparatus moves the receiving apparatus for which the class is not updated for more than a predetermined time in normal communication, to the bottom of the receiving list, so that the receiving apparatus of a lower class is shifted to an upper class. By this means, the receiving apparatus that belong to a lower class is not likely to receive limitation, which occurs when carrying out explicit multicast, to the transmission rate by other receiving apparatuses listed in an upper class, so that it is possible to deliver a packet in order of high transmission capability.

INDUSTRIAL APPLICABILITY

The present invention is useful for a transmitting apparatus that carries out data transmission according to the explicit multicast scheme and is suitable for canceling limitation, which is caused by the delivery order of a packet, to the transmission rate for a receiving apparatus.

The invention claimed is:

1. A transmitting apparatus for delivering the same packet to a plurality of receiving apparatuses connected through a network, the same packet being delivered through a unicast route using a receiving apparatus list that shows a delivery order for the plurality of receiving apparatuses, the transmitting apparatus comprising:
   a receiver that receives, from the plurality of receiving apparatuses, information related to transmission capabilities of the plurality of receiving apparatuses;
   a receiver capability estimating section that estimates bands available for use with the plurality of receiving apparatuses, based on the received information related to the transmission capabilities;
   a receiver classifying section that classifies the plurality of receiving apparatuses into predetermined classes having associated thresholds, the classification being based on the estimated available bands;
   a classified receiver storing section that records a receiving apparatus list of each class classified by the receiver classifying section; and
   a receiver list rearranging section that rearranges the receiving apparatus list of each class recorded by the classified receiver storing section, in order from a highest available band, based on the estimated available bands,
   wherein the delivering of the same packet comprises transmitting the same packet to one of the plurality of receiving apparatuses such that the one receiving apparatus then transmits the same packet to another of the plurality of receiving apparatuses according, to the rearrange receiving apparatus list of each class.

2. The transmitting apparatus of claim 1, further comprising a measuring section that transmits, to the plurality of receiving apparatuses, a measuring packet for measuring the bands available for use with the plurality of receiving apparatus, wherein:
   the information related to the transmission capabilities of the plurality of receiving apparatuses comprises information provided in response to the measuring packet.

3. The transmitting apparatus of claim 1, wherein: after a predetermined period of time elapses, the receiver obtains information about a transmission capability of a predetermined receiving apparatus at the end of a subsequent predetermined period of time;
   the receiver capability estimating section estimates a band that will be available for use with the predetermined receiving apparatus at the end of the subsequent predetermined period of time, based on the obtained information about the transmission capability of the predetermined receiving apparatus;
   the receiver classifying section reclassifies the predetermined receiving apparatus into a class, based on the estimated band that will be available for use with the predetermined receiving apparatus; and when the reclassification changes the class of the predetermined receiving apparatus, the receiver list rearranging section rearranges the receiving apparatus list of the class including the predetermined receiving apparatus, in order from a highest available band.

4. The transmitting apparatus of claim 3, wherein: the classified receiver storing section records the receiving apparatus list of each classified class, and class update times at which the plurality of receiving apparatuses are reclassified into classes; and when there is no change of the classes by the reclassification, and a period of time equal to or greater than a specified period of time elapses after a class update time of the predetermined receiving apparatus, the receiver list rearranging section moves the predetermined receiving apparatus to a bottom of the receiving apparatus list of the class including the predetermined receiving apparatus.

5. A transmitting method for delivering the same packet to a plurality of receiving apparatuses connected through a network, the same packet being delivered through a unicast route using a receiving apparatus list that shows a delivery order for the plurality of receiving apparatuses, the transmitting method comprising:

at a receiver, receiving, from the plurality of receiving apparatuses, information related to transmission capabilities of the plurality of receiving apparatuses;

at a receiver capability estimating section, estimating bands available for use with the plurality of receiving apparatuses, based on the received information related to the transmission capabilities;

at a receiver classifying section, classifying the plurality of receiving apparatuses into predetermined classes having associated thresholds, the classification being based on the estimated available bands;

at a classified receiver storing section, recording a receiving apparatus list of each class classified at the receiver classifying section; and at a receiver list rearranging section, rearranging the receiving apparatus list of each class recorded at the classified receiver storing section, in order from a highest available band, based on the estimated available bands, wherein the delivering of the same packet comprises transmitting the same packet to one of the plurality of receiving apparatuses such that the one receiving apparatus then transmits the same packet to another of the plurality of receiving apparatuses according to the rearranged receiving apparatus list of each class.

6. A transmitting apparatus delivering the same packet to a plurality of receiving apparatuses connected through a network, the same packet being delivered through a unicast route using a receiving apparatus list that shows a delivery order for the plurality of receiving apparatuses, the transmitting apparatus comprising:

a receiver that receives, from the plurality of receiving apparatuses, information related to transmission capabilities of the plurality of receiving apparatuses;

a receiver capability estimating section that estimates bands available for use with the plurality of receiving apparatuses, based on the received information related to the transmission capabilities;

a receiver classifying section that classifies the plurality of receiving apparatuses into predetermined classes having associated thresholds, the classification being based on the estimated available bands;

a classified receiver storing section that records a receiving apparatus list of each class classified by the receiver classifying section; and a receiver list rearranging section that rearranges the receiving apparatus list of each class recorded by the classified receiver storing section, in order from a highest available band, based on the estimated available bands, wherein:

the classified receiver storing section records the receiving apparatus list of each classified class, and class update times at which the plurality of receiving apparatuses are reclassified into classes; and when there is no change of the classes by the reclassification, and a period of time equal to or greater than a specified period of time elapses after a class update time of a predetermined receiving apparatus, the receiver list rearranging section moves the predetermined receiving apparatus to a bottom of the receiving apparatus list of the class including the predetermined receiving apparatus.

* * * * *